United States Patent [19]

Rousseau et al.

[11] 3,896,135

[45] July 22, 1975

[54] 3-DEAZAGUANINE

[75] Inventors: Robert J. Rousseau, Laguna Niguel; Roland K. Robins, Santa Ana, both of Calif.

[73] Assignee: ICN Pharmaceuticals, Inc., Irvine, Calif.

[22] Filed: July 6, 1973

[21] Appl. No.: 377,078

[52] U.S. Cl. ............ 260/296 H; 424/263; 260/309
[51] Int. Cl. ............................................ C07d 31/42
[58] Field of Search ................................ 260/296 H

[56] References Cited
OTHER PUBLICATIONS

Korte, Chem. Ber. Vol. 85, pages 1012 to 1022 (1952).

Chemical Abstracts, Vol. 44, col. 7353 (1950), (abst. of British Patent 629,441).

Chemical Abstracts, Vol. 63, col. 7258 (1965), (abst. of Reshetov).

Chemical Abstracts, Vol. 70, Abst. No. 66547 (1969), (abst. of Germanova et al.).

*Primary Examiner*—John D. Randolph
*Attorney, Agent, or Firm*—Lyon & Lyon

[57] ABSTRACT

3-Deazaguanine and physiologically compatible salts thereof, useful as a broad spectrum anti-viral agent, are disclosed.

4 Claims, No Drawings

3-DEAZAGUANINE

BACKGROUND OF THE INVENTION

During the past decade, many nucleoside analogs have found to exhibit good antitumor and antiviral activities. Among the presently known synthetic nucleosidic antiviral agents, the more important generally are considered to be 5-iodo-2'-deoxyuridine (IDU), 9-β-D-arabinofuranosyladenine (ara-A) and 1-β-D-arabinofuranosylcytosine (ara-C). These compounds, however, are only active against a limited spectrum of viruses which does not include those causing respiratory diseases in man (influenza, common cold). The only nucleosidic analog of which are aware that is active against these respiratory disease viruses is 1-β-D-ribofuranosyl-1,2,4-triazole-3-carboxamide which is described in copending United States patent application, Ser. No. 240,252, filed Mar. 31, 1972, entitled 1,2,4-Triazole Nucleosides, now U.S. Pat. No. 3,798,209 granted Mar. 19, 1974, which application is a continuation in part of Ser. No. 149,017, filed June 1, 1971, entitled 1,2,4-Triazole Nucleosides, now abandoned and assigned to the same assignee as this application.

Certain derivatives of this latter compound have also been found to have significant antiviral activity, as have the triazole bases, 1,2,4-triazole-3-carboxamide and 1,2,4-triazole-3-thiocarboxamide. Even with the advent of such compounds, however, and the discovery of their antiviral efficacy, there remains a need for compounds which are capable of effectively inhibiting virus infections, especially respiratory disease viruses.

With the foregoing need in mind, we determined to synthesize the pyridine base, 6-aminoimidazo[4,5c]pyridin-4-one (3-deazaguanine), a compound not previously reported, and derivatives thereof to see whether such compounds would possess effective antiviral capability.

SUMMARY OF THE INVENTION

The present invention thus relates to 3-deazaguanine and physiologically compatible salts as represented by the following:

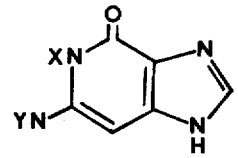

in which Y is $H_2$ and X is H or an alkalai metal.

DETAILED DESCRIPTION OF THE INVENTION

The compounds of this invention may be prepared in accordance with the following schematic representation, as set forth in the illustrative esamples which follow, in which temperatures and melting points are expressed in degrees centigrade.

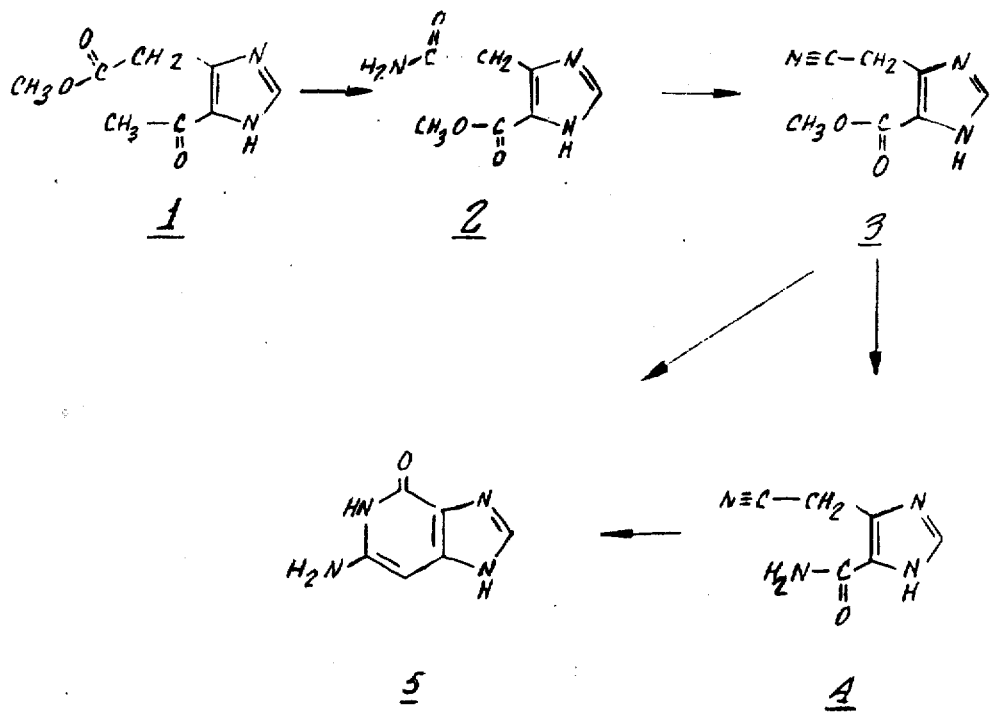

EXAMPLE I

Methyl 4(5)-acetamido-2-imidazole-5(4)-carboxylate (Compound 2)

Compound 1[1] (20.4 g, 0.103 mole) was added to 1800 ml of methanol saturated at 0° with ammonia, and the amber solution which resulted was stirred for 16 hr at room temperature. The light orange solution was evaporated in vacuo to dryness, the residue was triturated with 50 ml of methanol, and then collected and air dried to yield 2 16.6 g (88%), m.p. 230°–232° (literature m.p. 242°–244°).

[1] R. K. Robins et al., J. Org. Chem. 28, 3041 (1963).

EXAMPLE II

Methyl 4(5)-acetonitrile-2-imidazole-5(4)-carboxylate (Compound 3)

16.6 g, 0.097 mole of compound 2 was refluxed in 800 ml of phosphorousoxychloride for three hours. The excess phosphorous oxychloride was removed in vacuo using a rotary evaporator, and the dark syrupy residue was treated with 100 ml of ice until all of it had dissolved (an acetone dry-ice bath was used to maintain the temperature of the solution between 0°–10° C throughout this process). The dark solution was carefully neutralized until the pH stabilized at 6 (pHydrion paper) while the temperature was maintained below 15° C. The dark colored mixture was allowed to stand at 4° C for 16 hr, the precipitate was collected, washed with ice water (3 × 50 ml), and then air dried to yield 3, 12.4 g (77%, m.p. 168°–170°. A small amount of this material was recrystallized from water to provide an analytical sample, m.p. 170°–171°, $\lambda_{max}^{pH\ 1}$ 222 nm, 10,700; $\lambda_{max}^{pH\ 11}$ 251 nm, 10,600; n.m.r. (DMSO-$d_6$) δ3.89 (s, 3H OCH$_3$), δ4.20 (s, 2H, CH$_2$), 7.90 (s, 1H, H$_2$), 13.3 (br, 1H, NH).

Anal. Calcd for $C_7H_7O_2N_3$: C, 50.91; H, 4.27; N, 25.45. Found: C, 50.70; H, 4.25; N, 25.35.

EXAMPLE III

4(5)-Acetonitrile-2-imidazole-5(4)-carboxamide (Compound 4)

Compound 3 (5.0 g, 0.0303 moles) was heated with 200 ml of liquid ammonia in a steel reaction vessel for 48 hr. The excess ammonia was allowed to evaporate to dryness, the residue was taken up in ca 20 ml of water, collected and air dried to yield 2.85 g (62.5%) of compound 4, m.p. 225°–228°. A small amount of this material was recrystallized from water to give an analytical sample (beige needles), m.p. 230°–232°.

Anal. Calcd. for $C_6H_6N_4O$ : C, 48.00; H, 4.03; N, 37.32. Found: C, 48.14; H, 3.97; N, 37.51.

EXAMPLE IV

6-Aminoimidazo[4,5-c]pyridin-4-one (3-deazaguanine) (Compound 5)

Method A. 1.5 g (0.01 mole) of compound 4 was refluxed in 15 ml of 10% $Na_2CO_3$ for 4 hr, neutralized to pH 6 with concentrated hydrochloric acid and then allowed to stand at 4° C for 16 hr. The resulting solid was collected, washed well with ice water and dried 8 hr at 100° in vacuo to yield 750 mg (50%) of compound 5, m.p.>300°.

Anal. Calcd for $C_6H_6ON_4$: C, 48.00; H, 4.03; N, 37.32. Found: C, 47.99 H, 4.10; N, 37.19.

Method B. Compound 3 (5.0 g, 0.0303 mole) was heated in 200 ml liquid ammonia in a steel reaction vessel at 100° C for 96 hr. The ammonia was allowed to evaporate, and the residue was taken up in 60 ml of $H_2O$, collected and air dried to yield 2.85 g (56%) m.p.>300°. This was recrystallized from 130 ml of water to afford 2.10 g of greenish-brown needles which had the same characteristics chromatographically and spectrometrically as the product from Method A.

EXAMPLE V

6-Aminoimidazo[4,5-c]pyridin-4-one (3-deazaguanine) via $NH_4Cl$ catalysis.

A solution of 0.50 g (3 mmole) of compound 3 and 0.50 g $NH_4Cl$ in 20 ml of methanol, into which $NH_3$ had been bubbled for 2 minutes at ambient temperature, was enclosed in a steel bomb and heated in an oil bath maintained at 150° for 16 hours. The contents were evaporated, taken up in 20 ml hot $H_2O$, and filtered. Tlc showed 3-deazaguanine as the sole detectable product. Cooling deposited 0.15 g product (33%).

It will be apparent to those skilled in the art, given the foregoing disclosure, that acid addition salts can be prepared following the standard procedure known in the art, as by suspension of 3-deazaguanine in water and reaction with the appropriate acid reactant such as hydrochloric acid, sulfuric acid, etc. Similarly, the basic salts may be formed by reaction with alkali metalic bases such as sodium hydroxide, etc.

EXAMPLE VI

In this example, 3-deazaguanine was tested to determine its in vitro antiviral efficacy, using the virus-induced cytopathogenic effect (CPE) method of Sidwell, et al. (Applied Microbiology 22:797–801, 1971). Briefly, the CPE procedure includes the dissolution of the antiviral agent in a cell culture medium consisting of vitamins, amino acids, serum, buffer, penicillin, streptomycin and indicator dye in water. The virus suspended in the cell culture medium was added to an established monolayer of KB cells or RK-13 cells, and an equal volume of the antiviral agent was then added within 15 minutes. The infected treated cells were graded following microscopic examination. Controls for each experiment include cell controls (cells and cell culture medium only), virus controls (cells and virus and cell culture medium) and toxicity controls (cells and chemical and cell culture medium).

The virus rating (VR) system of Sidwell et al., described in Applied Microbiology, supra, was used to evaluate the degree of significance of CPE inhibition. A VR greater than 0.5 is indicative of significant antiviral activity and a VR of less than 0.5 suggests slight antiviral activity.

The results of the in vitro testing are shown in Table I which follows, as is comparative data for the compound, 1-β-D-ribofuranosyl-1,2,4-triazole-3-carboxamide.

TABLE I

IN VITRO ANTIVIRAL ACTIVITY OF 3-DEAZAGUANINE
AND 1-β-D-RIBOFURANOSYL-1,2,4-TRIAZOLE-3-CARBOXAMIDE

| Virus | 3-Deazaguanine | 1-β-D-Ribofuranosyl-1,2,4-triazole-3-carboxamide |
|---|---|---|
| Type A influenza | 0.9 | 1.1 |
| Type 1 Rhino | 0.7 | 0.7 |
| Type 2 Rhino | 1.0 | 1.1 |
| Type 8 Rhino | 1.2 | 0.8 |
| Type 13 Rhino | 1.1 | 1.0 |
| Type 30 Rhino | 0.4 | 0.6 |
| Type 56 Rhino | 1.1 | 0.8 |
| Type 3 Parainfluenza | 1.1 | 0.9 |
| Type 1 Herpes simplex | 1.0 | 1.2 |

TABLE I—Continued

IN VITRO ANTIVIRAL ACTIVITY OF 3-DEAZAGUANINE AND 1-β-D-RIBOFURANOSYL-1,2,4-TRIAZOLE-3-CARBOXAMIDE

| Virus | 3-Deazaguanine | 1-β-D-Ribofuranosyl-1,2,4-triazole-3-carboxamide |
|---|---|---|
| Vaccinia | 1.1 | 1.1 |
| Myxoma | 0.6 | 0.8 |
| Type 3 Adeno | 1.0 | 1.0 |
| Cytotoxicity*-KB cells | 1.0 | 3.2 |
| Cytotoxicity-RK-13 cells | 1.0 | 10.0 |
| Cytotoxicity-Chick Embryo-Cells | 3.2 | 3.2 |

*Cytotoxicity expressed as the dose causing no visible changes to the cells as examined microscopically after 72 hr exposure to the compound at 37°C. KB cells: Human adenocarcinoma of the nasopharynx; RK-13 cells: Continuous passage rabbit kidney. Chick embryo cells: Primary cells derived from minced 9-day-old chicken embryos.

EXAMPLE VII

3-Deazaguanine was also tested for effectiveness against influenza $A_2$ virus in an animal experiment. In this study, 16–17 g. female Swiss Webster mice were lightly anesthetized and infected intranasally with a 75% lethal dose ($LD_{75}$) of strain Japan 305 of influenza $A_2$ virus. Fifteen minutes prior to their exposure to virus, the mice were treated intraperitoneally with 3-deazaguanine or 1-β-D-ribofuranosyl-1,2,4-triazole-3-carboxamide, using varying doses of each suspended in sterile physiological saline. Virus control mice were pretreated with saline only, and toxicity control animals were treated with the pertinent dosages of each drug but only sham-infected. The animals were observed over a 21-day period, with deaths occurring during this period recorded daily. The results of this study, summarized in Table II, indicate both compounds to have a significant anti-influenza virus effect.

3-Deazaguanine has also demonstrated preliminary anti-bacterial activity against E-Coli (gram negative) and staphylococcus aureus (gram positive).

When 3-deazaguanine is prepared synthetically, methyl 4(5)-acetamide-2-imidazole-5(4)-carboxylate is reacted with a dehydrating agent such as phosphorous oxychloride, oxalyl chloride, thionyl chloride, etc. under refluxing conditions to yield methyl 4(5)-acetonitrile-2-imidazole-5(4)-carboxylate, which is then heated with liquid ammonia at a temperature between about 100° and 150°C. to give 4(5)-acetonitrile-2-imidazole-5(4)-carboxamide. This compound is then reacted, under refluxing conditions, with an alkalai metal carbonate such as sodium carbonate, to provide 3-deazaguanine. Alternatively, 3-deazaguanine may be prepared directly from the acetonitrile carboxylate by treatment with ammonium chloride in an aliphatic alcohol such as methanol. etc., in the presence of ammonia at a temperature between about 100° and about 150°C.

TABLE II

EFFECT OF A SINGLE INTRAPERITONEAL INJECTION OF 3-DEAZAGUANINE OR 1-β-D- RIBOFURANOSYL-1,2,4-TRIAZOLE-3-CARBOXAMIDE ON INFLUENZA $A_2$ VIRUS INFECTIONS IN MICE

| Drug | Dosages (mg/kg) | Toxicity Control Surv/Total | Infected, Treated | | | |
|---|---|---|---|---|---|---|
| | | | Surv[a]/Total | Survivor Increase p[b] | Mean Survival Time[c] (days) | Survival Time Increase p[d] |
| 3-Deazaguanine | 400 | 0/5 | 1/10 | — | 9.3 | 0.05 |
| | 200 | 3/5 | 2/10 | — | 9.7 | 0.05 |
| | 100 | 5/5 | 5/10 | 0.1 | 9.0 | 0.05 |
| 1-β-D-Ribofur-anosyl-1,2,4-triazole-3-car-boxamide | 800 | 5/5 | 1/10 | — | 9.0 | 0.05 |
| | 400 | 5/5 | 2/10 | — | 11.4 | 0.01 |
| | 200 | 5/5 | 4/10 | 0.2 | 9.3 | 0.05 |
| Saline | — | — | 4/20 | — | 7.8 | — |

[a]Day 21 survivors.
[b]Probability (chi square analysis).
[c]Animals dying on or before day 21.
[d]Probability (t test).

It will be appreciated from Examples VI and VII that 3-deazaguanine has shown a broad spectrum of antiviral activity and is particularly effective against respiratory disease viruses. In several instances, the compound demonstrated significantly greater in vitro activity than the comparative compound, 1-β-D-ribofuranosyl-1,2,4-triazole-3-carboxamide. In view of the close structural similarity to 3-deazaguanine and the usual increased solubility of the salts of active pyridine compounds, the acid addition salts would also be expected to exhibit antiviral activity.

We claim:
1. A compound of the structure:

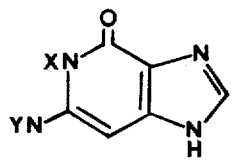

Where Y is $H_2$ and X is H or an (alkalai)alkali metal.

2. 6-Aminoimidazo pyridin-4-one.

3. A process of preparing 3-deazaguanine comprising reacting methyl 4(5)-acetamido-2-imidazole-5(4)-carboxylate under refluxing conditions with a dehydrating agent to afford methyl 4(5)-acetonitrile-2-imidazole-5(4)-carboxylate, heating such acetonitrile compound to a temperature of about 100 to about 150°C. in the presence of liquid ammonia to provide 4(5)-acetonitrile-2-imidazole-5(4)-carboxamide, and subsequently refluxing such acetonitrile carboxamide in the presence of an alkalai metal carbonate to afford 3-deazaguanine.

4. The process of claim 3 in which the acetonitrile carboxylate is treated with $NH_4Cl$ in an aliphatic alcohol and in the presence of ammonia at a temperature of about 100° to about 150°C. to afford 3-deazaguanine.

* * * * *